Sept. 22, 1970   KARL-FRIEDRICH LEOWALD   3,530,357
CURRENT RECTIFYING SYSTEM FOR HIGH VOLTAGE
Filed Dec. 17, 1968                    2 Sheets-Sheet 2

United States Patent Office 3,530,357
Patented Sept. 22, 1970

3,530,357
CURRENT RECTIFYING SYSTEM FOR HIGH VOLTAGE
Karl-Friedrich Leowald, Erlangen, Germany, assignor to Siemens Aktiengesellschaft, Berlin, Germany, a corporation of Germany
Continuation-in-part of application Ser. No. 662,694, Aug. 23, 1967. This application Dec. 17, 1968, Ser. No. 784,310
Claims priority, application Germany, Dec. 22, 1967, 1,638,637
Int. Cl. H02m 3/28
U.S. Cl. 321—2                                      4 Claims

ABSTRACT OF THE DISCLOSURE

A current rectifier system for high voltage has a number of thyristors series connected in the load circuit. The thyristors are fired simultaneously from respective secondary windings of pulse transformers whose primary winding is constituted by a single loop of a high voltage cable upon which iron cores of the secondary windings are placed one beside the other. The cable comprises a plurality of mutually insulated electrical conductors each connected to a source of direct current through a corresponding one of a plurality of inverter circuits each of which converts the direct current into alternating current pulses so that each transformer core is alternately magnetized in opposite directions of magnetization. The secondary circuits connected to the firing electrodes of the thyristors comprise rectifier diodes which provide properly polarized firing pulses at the proper times.

DESCRIPTION OF THE INVENTION

The present application is a continuation-in-part application of my patent application Ser. No. 662,694, filed Aug. 23, 1967.

My invention relates to a system for transforming electric current at high voltage. More particularly, my invention relates to a current transforming device which incorporates solid state semiconductor components.

It has been proposed to utilize thyristors or semiconductor controlled rectifiers for current transformation. Thyristors, however, are sensitive not only to overvoltage and overload current but also to a steep rise of the voltage or load current, or to a steep rise of the inverse current occurring after turn-off. In equipment for use at high voltages, requiring a relatively large number of thyristors, it is necessary, therefore, to fire all the thyristors substantially at the same time and in many cases to also switch them to their non-conductive condition or turn them off simultaneously, for example, in inverter networks with constrained commutation.

It has been proposed to connect the gate or firing electrodes of all series-connected thyristors or respective groups of such thyristors through a common pulse transformer to a direct voltage source which provides a gate control voltage for the thyristors. The primary winding of the pulse transformer is constituted by an insulated high voltage cable equipped with a corresponding number of magnetic cores, each carrying a secondary winding whose induced current controls one of the respective thyristors. The high voltage cable on which the magnetic cores are arranged one beside the other has the shape of a loop. The primary winding of the transformer thus has but a single turn so that its inductivity can be kept correspondingly slight. For pulse transmittal by means of such a single turn primary, a specific minimum size of the iron cross-section is required for each core.

An additional requirement for a large iron cross-section is involved in the control of thyristors appertaining to current rectifying equipment which generates long firing pulses of several milliseconds duration. The transmittal of such pulses with a pulse transformer of the aforedescribed type is possible only with a correspondingly large iron cross-section of the transformer cores.

With an increasing spacial extent of the transformer cores, however, a sufficient steepness of the leading edge of the secondary pulses, and, consequently, the simultaneous firing of the connected thyristors, is no longer assured. The number of thyristors controllable in this manner is thus limited to a maximum which is unsatisfactorily small for many purposes.

The principal object of the present invention is to provide a new and improved current transformer device for high voltage.

An object of the present invention is to provide a current transforming or rectifying system suitable for high voltage operation which is able to control a considerably increased number of thyristors simultaneously.

An object of the present invention is to provide a current transforming system comprising a pulse transformer having magnetic cores for controlling a corresponding number of simultaneously operating thyristors, in which system the iron cross-section of the magnetic cores is reduced in comparison to that heretofore necessary for a specific number of thyristors.

To achieve these objects and in accordance with my invention, I proceed from the recognition that in systems of the aforedescribed type the iron cross-section may be reduced considerably if both directions of magnetization of the cores are utilized.

To do this, and in accordance with more specific features of my invention, I provide a current rectifying system for high voltage with a series connection of thyristors which have their respective gate control or firing circuits connected to a direct voltage source via a pulse transformer whose primary winding is constituted by a high voltage cable and which has a number of magnetic cores equipped with respective secondary windings. The direct voltage source serves as a supply of control or firing voltage. The series connection of the thyristors may also be subdivided into groups of which each is provided with its own pulse transformer of the type mentioned.

In accordance with the present invention, an alternating current is supplied to the high voltage cable and the rfespective secondary windings act upon the thyristor gate electrodes via respective rectifiers. The alternating current is preferably provided by an inverter circuit, which translates direct current into the required alternating current. The current pulses in the secondary circuit of the pulse transformer correspond to the frequency of the alternating current of the primary winding and are rectified in the secondary circuit and supplied to the control electrode of the corresponding connected thyristor. Each time there is formed only a limited sequence of short pulses whose transmittal is possible with the aid of a very slight iron cross-section. In such a system, up to fifty secondary windings or more can be arranged on a common core, thus permitting a large number of thyristors to be controlled simultaneously.

In order that the present invention may be readily carried into effect, it will now be described with reference to the accompanying drawings, wherein.

Figure 1:
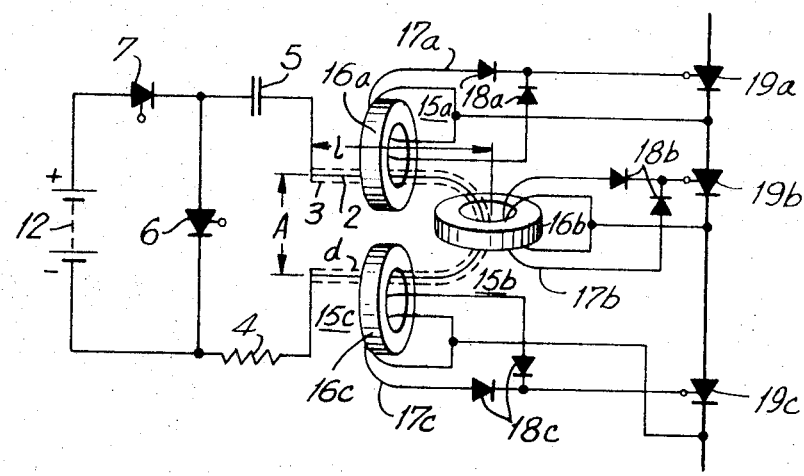
FIG. 1 is a circuit diagram of an embodiment of a portion of the current rectifying system of the present invention.

In FIG. 1, a cable 2 is covered by electrical insulation for several 100 kilovolts. The insulation is indicated by broken lines. The cable 2 is connected in parallel with a thyristor 6 via a shift capacitor 5 and a current limiting resistor 4. The thyristor 6 is connected in series with a charging thyristor 7 to a direct voltage source 12 serving as a source of control voltage. The firing control cable 2 forms a loop having a length L which is about 400 cm., for example, the spacing A between its legs being approximately 50 cm. or less, for example. The inductivity of the cable loop for the purposes of the invention should not appreciably exceed a few microhenries such as, for example 5 $\mu$H. The cable conductor, therefore, is preferably made of a tube having an outer diameter $d$ of about 3 cm., for example.

A plurality of transformers 15a, 15b, 15c, and so on, have their annular iron cores 16a, 16b, 16c, and so on, placed on the cable 2 one beside the other. Thus, for example, twelve such cores may be placed on the cable, only three of said cores being shown in FIG. 1. Each transformer core 16 may carry a large number such as, for example, thirty-five, secondary windings 17 formed of a preferably statically shielded conductor. Each of the secondary windings is connected through a corresponding rectifier, such as diodes 18a, 18b, 18c, and so on in a midpoint connection, in parallel to the firing path of a corresponding thyristor 19a, 19b or 19c, and so on. Thus, each secondary winding is connected between the gate electrode and the cathode of a corresponding thyristor via a corresponding rectifier. Each of the thyristors 19a, 19b, 19c, and so on, is connected in the main circuit or load circuit in series with the other thyristors of the large number of thyristors analogously connected to the corresponding ones of the secondary windings. The current rectifying system of the present invention may thus control a series connection of 420 thyristors, in, for example, a current rectifier plant for 400 kilovolts direct voltage.

When the charging thyristor 7 is fired, which may be accomplished by any suitable firing circuit, of which various configurations are well known, the shift capacitor 5 is charged and the primary winding 2 of the transformers 15a, 15b, 15c, and so on, receives a current surge whose intensity is limited by the resistor 4. Corresponding to the winding ratio, a pulse is induced in each of the secondary windings 17a, 17b, 17c, and so on, and is supplied via the corresponding rectifier diodes 18a, 18b or 18c, and so on, to the control electrode of the corresponding thyristor 19a, 19b or 19c, and so on. The thyristor 7 is turned off or switched to its non-conductive condition as soon as the capacitor 5 is charged. Subsequently, the thyristor 6 is fired or switched to its conductive condition and the capacitor 5 then discharges through the resistor 4. The resulting primary current pulse of the transformers 15a, 15b, 15c, and so on flows in the reverse direction.

The secondary current is rectified and the control electrode of each thyristor 19 again receives a short pulse having a duration of preferably about 5 to 50 microseconds, especially a pulse of about 20 microseconds. Upon the discharge of the capacitor 5, the charging thyristor 7 is again fired and the cycle begins anew. The capacitance of the capacitor 5 in conjunction with the inductivity of the loop of the cable 2, as well as the resistance of the resistor 4, determine the duration of the short pulses supplied to the thyristor 19. The number of pulses thus supplied to the gate electrode of the thyristor 7 determines in each case the total duration of the pulse sequence.

It will be noted that the circuit comprising the components 4, 5, 6 and 7 operates as an inverter circuit which translates the direct current from the source 12 onto the alternating current pulses applied to the thyristor 19. The firing of the thyristors 6 and 7 may be controlled, for example, by a keyer or clock stage (not shown in the figures) operating at a pulse sequence frequency in the order of 10 kHz., for example. Suitable keying or clock pulse modules are known and available for data processing and pulse modulating purposes.

Figure 2:
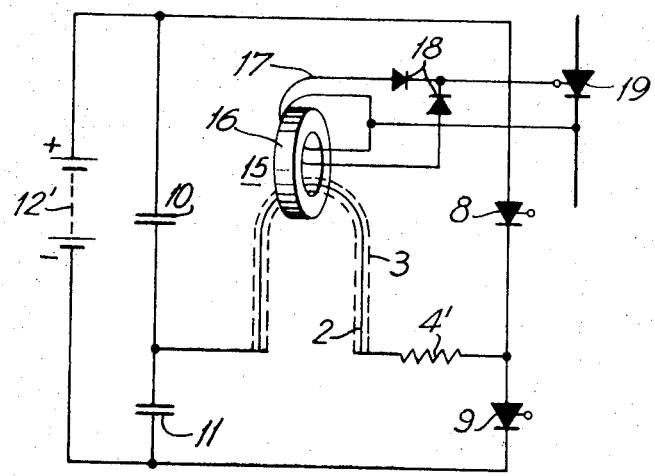
FIG. 2 is a circuit diagram of another embodiment of a portion of the current rectifying system of the present invention.

In the embodiment shown in FIG. 2, the cable 2 is connected at one end through the resistor 4' to the connecting conductor of a series arrangement of thyristors 8 and 9, and at the other end to a connecting line between two storage capacitors 10 and 11. The series connection of the thyristors 8 and 9 is connected in parallel with the series connection of the storage capacitors 10 and 11 and in parallel with the control voltage source 12.

The thyristors 8 and 9 are alternately fired by a keyer or clock stage (not shown in the figures) having a keying frequency of about 10 kHz., for example. Consequently, an alternating current flows through the primary winding 2 of the transformer 15. The oscillation duration of the primary winding current corresponds to a frequency of about 10 to 25 kHz., for example. The current on the secondary side of each transformer 15 is rectified by the corresponding diodes 18 and supplied to the control electrode of the corresponding thyristor 19. With a current conducting period of each pair of diodes 18, and consequently a pulse duration of the individual pulses of about 20 microseconds, and with a non-current interval of about 30 microseconds between the individual pulses, the resulting short pulses have a stepness of more than 2 amps per microsecond. Under these conditions, a large number of thyristors may be fired without dangerous or damaging overvoltages. In such a system, all of the primary and secondary pulses have at least approximately the same waveshape.

For simplifying the control, one of the thyristors 8 or 9 may be supplied each time with continuous pulses, whereas the other of said thyristors is supplied with firing pulses only during the desired period of a pulse chain to be formed.

Figure 3:
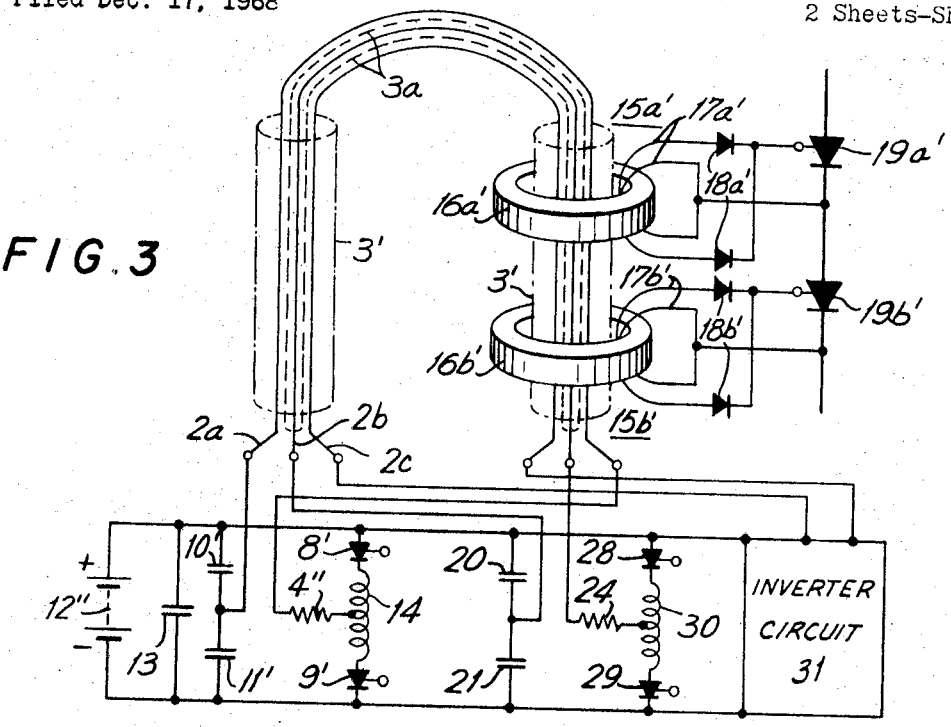
FIG. 3 is a circuit diagram of another embodiment of a portion of the current rectifying system of the present invention.
Figure 5:
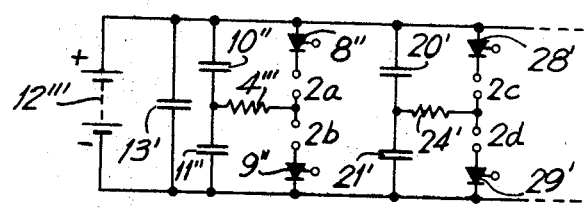
FIG. 5 is a circuit diagram of another embodiment of a portion of the current rectifying system of the present invention.

In the embodiments of FIGS. 3 and 5, the high voltage primary winding cable of the pulse transformers 15a', 15b', and so on, comprises a plurality of mutually insulated electrical conductors. Alternating current pulses are supplied to each of the electrical conductors, in specific time relationship to each other, with each pulse supplied to a conductor appearing in a non-current interval of the other conductors. This system has the advantage that the individual conductors of the primary winding cable may be supplied with relatively short duration current pulses. The result is a reduction in the amplitude of the current pulses at a specific rise time.

If the alternating current is supplied to the conductors of the primary winding by an inverter which includes thyristors, the average charge or load of the thyristors of the pulse transformer is decreased. Furthermore, a close sequence of control current pulses can be provided by the pulse transformer via thyristors without a very short non-conductive or turn-off time.

In FIG. 3, the primary winding cable of the pulse transformers 15a', 15b' and so on, comprises a plurality of individual electrical conductors 2a, 2b and 2c which are mutually insulated by an insulating wrapping 3a, shown in broken lines. The cable has an outer insulation 3 which may be rated for high voltages, for example, several hundred kilovolts and is merely indicated as a sleeve or cylinder of insulating material.

The individual conductors 2a, 2b and 2c are connected to separate corresponding alternating current sources which function as pulse generators for the primary currents of the pulse transformers. An inverter circuit is preferably utilized as an alternating current source. Thus, the conductor 2a is connected in series with a resistor 4" rated for damping, in the load circuit of a first inverter circuit comprising two thyristors 8' and 9' and two capacitors 10' and 11', which preferably function as a tank circuit with the inductivity of the connected conductor 2a.

The first inverter circuit is connected to a DC voltage source 12" such as for example, a storage battery. A storage capacitor 13 is connected in parallel with the battery 12. The thyristors 8 and 9 are connected to each other via a limiting reactor 14, which is rated according to the firing of one of the thyristors 8 or 9, for the purpose of limiting the voltage rise. The resistor 4" is connected to the center tap of the reactor or inductor 14.

The conductor 2b is connected to a second inverter circuit, which is similar to the first inverter circuit and comprises two capacitors 20 and 21, a resistor 24, two thyristors 28 and 29 and an inductor or reactor 30 connected in the same manner as the first inverter circuit. The conductor 2c is connected to an inverter circuit 31, which is the same as the first and second inverter circuits and is shown in block form.

A plurality of cores 16a', 16b', and so on, are positioned on the cable of the pulse transformers 15a', 15b', and so on. The cores 16a', 16b', and so on, are positioned adjacent each other on the cable. Each of the cores 16a', 16b', and so on, has a secondary winding 17a' or 17b', or so on, wound around it. Although a plurality of secondary windings may be wound around each of the cores 16a', 16b', and so on, only a single secondary winding is shown on each core to maintain the clarity of illustration.

The control grid or gate electrode of a thyristor 19a' is connected to the secondary winding 17a' of the core 16a' via a pair of diodes 18a' connected as a rectifier. The control grid or gate electrode of a thyristor 19b' is connected to the secondary winding 17b' of the core 16b' via a pair of diodes 18b' connected as a rectifier. Each half wave of each of the conductors 2a, 2b and 2c induces a corresponding pulse in the corresponding secondary winding. The pulse train in each conductor is delivered, alternately, via one of the corresponding pair of diodes 18 in each control circuit, to the control electrode of the corresponding thyristor 19.

Figure 4:
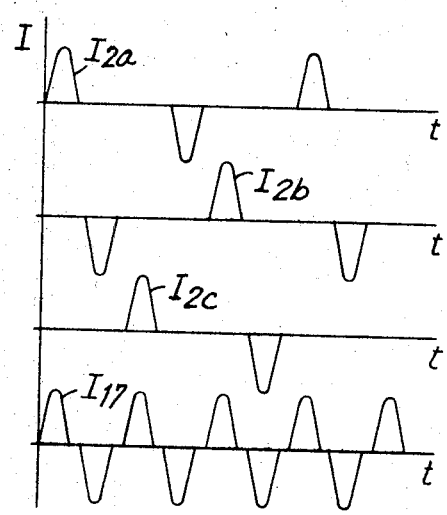
FIG. 4 is a graphical presentation of pulses appearing in various leads of FIG. 3.

The thyristors 8 and 9 and the thyristors 28 and 29, are preferably so controlled that the pulses in each of the conductors 2a, 2b and 2c are mutually displaced with respect to time, as shown in FIG. 4. Each pulse in each of the primary conductors 2a, 2b and 2c is preferably provided in a non-current interval of the other two of said primary conductors. The pulses of the individual conductor 2a, 2b and 2c are added to each other to produce resultant pulses $I_{17}$ in the secondary windings 17 of the pulse transformers 15.

The non-current interval between adjacent opposite polarity pulses $I_{2a}$ in the primary conductor 2a is preferably so selected, as are the corresponding intervals in the primary conductors 2b and 2c, that the resultant pulses $I_{17}$ in the secondary windings 17 of the transformers 15 supply an almost continuous, almost non-current interval-free, current to the control electrodes of the thyristors 19. In this type of control, each current conduction of one of the thyristors 8 and 9 and one of the thyristors 28 and 29 is followed by a non-current or no-load interval from the resultant sum of the current conducting time to the time that the same thyristor is again current conductive. The average load of the thyristors 8 and 9 and of the thyristors 28 and 29 of the inverter circuits is thus relatively small.

A particularly preferred embodiment of the inverter circuit of a configuration of the alternating current pulse source of the present invention is shown in FIG. 5. In FIG. 5, one of the individual primary conductors 2a, 2b, 2c and 2d, for example, is connected in series with one of the thyristors of the inverter circuits which supply the primary winding of the pulse transformer with current. The inverter circuit connection of the embodiment of FIG. 5 permits two individual conductors of the primary winding, to be supplied with pulses via a common inverter circuit.

Another advantage of the embodiment of FIG. 5 is that the charge or load of the thyristors 8 and 9 or of the thyristors 28 and 29 of the inverter circuits is reduced through the voltage rise. Since in the current rectifying system of the present invention, the primary conductors 2a and 2b are magnetically coupled to each other and the primary conductors 2c and 2d are magnetically coupled to each other, their inductivities have the same limiting effect upon the voltage rise at the fired thyristor, as the inductors 14 and 30 of the embodiment of FIG. 1.

While the invention has been described by means of specific examples and in specific embodiments, I do not wish to be limited thereto, for obvious modifications will occur to those skilled in the art without departing from the spirit and scope of the invention.

I claim:

1. A current rectifying system for high voltage, comprising
    a main circuit having thyristors connected in series with each other, each thyristor having a gate electrode;
    a pulse transformer having a primary winding comprising a high voltage cable having a plurality of mutually insulated electrical conductors, a plurality of mangetizable cores on said cable, and secondary windings on each of said cores;
    a plurality of rectifier means through a corresponding one of which each of said secondary windings is connected to the gate electrode of a corresponding one of said thyristors; and
    an alternating current pulse source connected to said cable for alternately magnetizing said cores in opposite directions whereby said gate electrodes receive firing pulses due to positive as well as negative pulses applied to said cable, said alternating current pulse source comprising direct current supply means and a plurality of inverter circuits each connected between said direct current supply means and a corresponding one of the conductors of the primary winding cable of said pulse transformer for converting the direct current to alternating current pulses.

2. A current rectifying system as claimed in claim 1, wherein each of said inverter circuits includes thyristors and each of the conductors of said primary winding cable of said pulse transformer is connected to a corresponding one of the thyristors of said inverter circuits.

3. A current rectifying system as claimed in claim 1, wherein said alternating current pulse source supplies to each of the conductors of said primary winding cable a plurality of pulses which are mutually displaced with respect to time.

4. A current rectifying system as claimed in claim 3, wherein the pulses supplied to each of the conductors of said primary winding cable alternate in polarity and the pulses supplied to each of said conductors are displaced in time relative to the pulses supplied to the others of said conductors.

References Cited

UNITED STATES PATENTS

| 3,267,290 | 8/1966 | Diebold. | |
|---|---|---|---|
| 3,398,348 | 8/1968 | Kilgore et al. | 321—27 X |
| 3,409,818 | 11/1968 | Gillett | 34—27 |

FOREIGN PATENTS

| 1,331,827 | 5/1963 | France. |
|---|---|---|

J D MILLER, Primary Examiner

G. GOLDBERG, Assistant Examiner

U.S. Cl. X.R.

307—240, 252, 262; 321—27

PO-1050
(5/69)

UNITED STATES PATENT OFFICE
CERTIFICATE OF CORRECTION

Patent No. 3,530,357      Dated September 22, 1970

Inventor(s) Karl-Friedrich Leowald

It is certified that error appears in the above-identified patent and that said Letters Patent are hereby corrected as shown below:

In the heading, page 1, column 1 - the German priority number should read --P 16 38 637.1--

SIGNED AND
SEALED
DEC 8 1970

(SEAL)
Attest:

Edward M. Fletcher, Jr.
Attesting Officer

WILLIAM E. SCHUYLER, JR.
Commissioner of Patents